United States Patent Office 3,513,079
Patented May 19, 1970

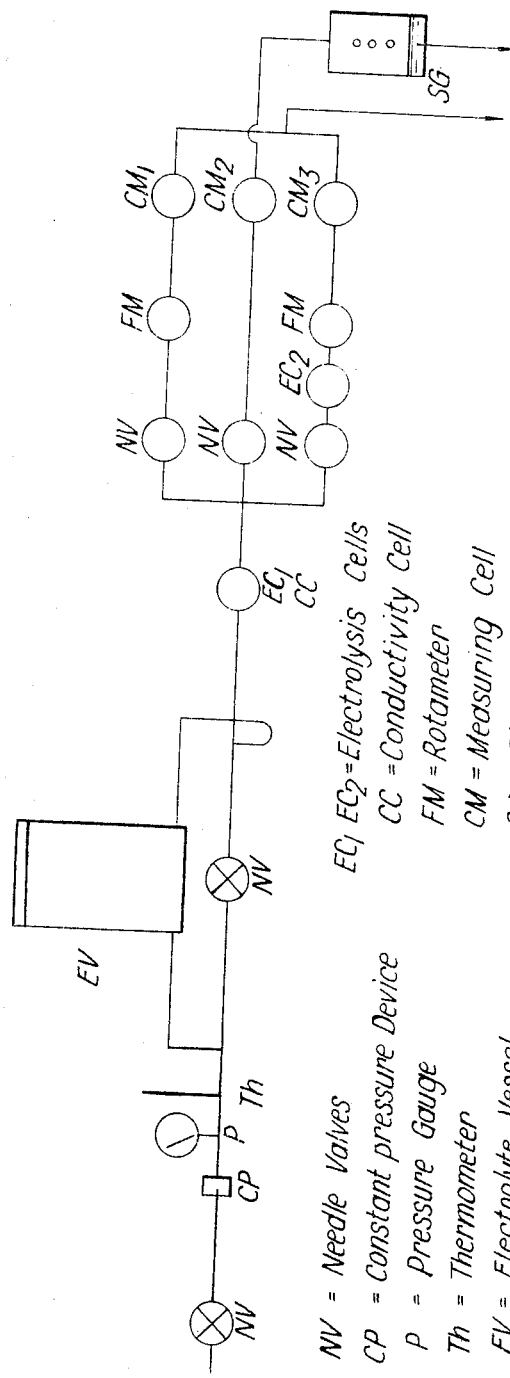
Fig. 1. FLOW DIAGRAM

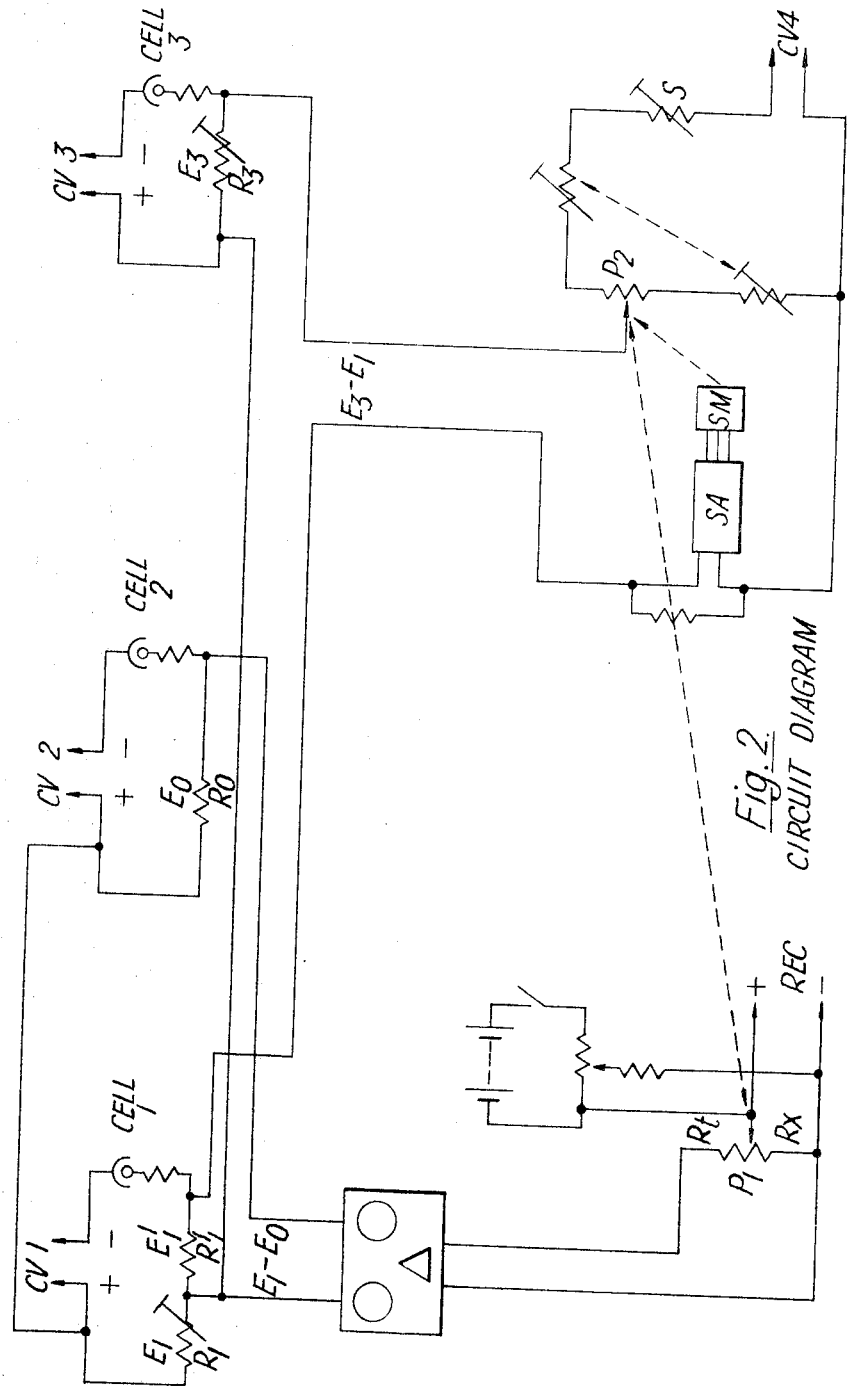
Fig. 2 CIRCUIT DIAGRAM

3,513,079
METHOD AND APPARATUS FOR MEASURING THE CONCENTRATION OF DISSOLVED GAS IN A LIQUID
Reginald Gordon Harry Watson and Cyril Francis McCourt, Poole, England, assignors to National Research Development Corporation, London, England, a British corporation
Filed Jan. 5, 1966, Ser. No. 518,851
Claims priority, application Great Britain, Jan. 6, 1965, 652/65
Int. Cl. G01n 27/54, 27/46
U.S. Cl. 204—1      3 Claims

ABSTRACT OF THE DISCLOSURE

Method and apparatus for measuring the concentration of a dissolved gas in a liquid comprising passing liquid through three identical electrolytic cells arranged in parallel with a flow rate through two of the cells sufficiently high to produce thorough stirring of the liquid and a relatively reduced flow rate through the other and adding a known quantity of dissolved gas to the liquid passing through one of the high flow rate cells, each cell having a pair of electrodes insulated from each other to which an EMF is applied and measuring the electric current through each of the cells and utilizing the measurements to determine the concentration of the dissolved gas.

---

This invention relates to a method and apparatus for measuring the concentration of dissolved gases in liquids and in particular to measuring the concentration of dissolved oxygen in ionic liquids or solutions of ionizable salts in liquids and especially in dilute aqueous solutions either in the presence or absence of dissolved hydrogen, and finds particularly useful application in measuring the concentration of dissolved oxygen in boiler feed water.

This invention is based on our earlier invention disclosed in British patent specification No. 894,370 in which a sample quantity of the liquid under test was confined in an electrolytic cell of insulating material having at least a pair of electrodes insulated from each other to which an EMF is applied and measuring the electric current through the cell (a) whilst the liquid therein is being stirred, (b) at an interval after the stirrer has been stopped, (c) whilst the liquid therein is again being stirred, and (d) whilst the liquid therein is being stirred after the addition of a known quantity of the dissolved gas thereto, and utilizing the measurements to determine the concentration of the dissolved gas. The present invention is designed to measure the concentration of dissolved gases in liquids continuously and, in place of the single cell and stirrer previously used, three electrolytic measuring cells of insulating material are employed which are as nearly identical to each other as possible; a mechanical stirrer is not used but the effects of stirring, i.e. high mass transfer rates, are obtained in the case of two of the cells by, for example, fixing the electrodes in narrow bore cylinders so that the water velocity past the electrodes is high whilst in the other cell the water velocity past the electrodes is made as low as possible by using a flow rate only one-tenth that of the other two cells and fitting the electrodes in a wider bore cylinder. Thus in the first cell we have a high rate of mass transfer, say $M_1$; in the second cell we have a very low rate of mass transfer, say $M_0$; and in the third cell again a high rate of mass transfer, say $M_2$, which is equal to $M_1$. Referring to FIG. 1, which is a flow diagram, it will be seen that electrolyte can be added from the electrolyte vessel EV from a by-pass system if the electrical conductivity of the liquid is too low and the conductivity can be measured by a simple conductivity cell CC, whilst the water flow to the third cell $CM_3$ is arranged to have a continuous increment of 0.05 p.p.m. of oxygen provided from a small platinum electrolysis cell $EC_2$. Then if $I_1$, $I_0$ and $I_3$ are the currents in the cells $CM_1$, $CM_2$, and $CM_3$ repsectively, the oxygen concentration is given by:

$$O_2 = [(I_1 - I_0)/(I_3 - I_1)] \times 0.05 \text{ p.p.m.}$$

Derivation of this equation may be accomplished in the following manner. If a potential difference is applied to a platinum cathode and a carbon anode in a dilute aqueous solution of an electrolyte which contains dissolved oxygen, oxygen can be reduced at the cathode. By selecting a voltage between 1.0 and 1.6 volts, oxidation of hydrogen at the carbon anode is suppressed and the current is limited by the rate of diffusion of oxygen to the cathode. Under these conditions the current (I) is given by $$I_1 = I^1 + \frac{kc}{ZF} \tag{1}$$

where $I^1$ is the current at zero oxygen concentration; $k$=mass transfer coefficient for oxygen; Z and F have their usual electrochemical significance.

At a low transport rate, $k$ approaches zero and this can be achieved with an unstirred electrolyte or a low flow rate through the cell when $$I_0 \approx I^1 \tag{2}$$

If known increments of oxygen ($\delta c$) are added to an electrolyte containing an unknown amount of oxygen, it can be shown that there is a linear relation between current at a fixed transport rate and concentration as required by Equation 1 above or $$I_3 = I^1 + \frac{k(c+\delta c)}{ZF} \tag{3}$$

combining Equations 1, 2 and 3

$$\frac{I_3 - I_0}{I_1 - I_0} = \frac{c + \delta c}{c}$$

or $$c = \frac{I_1 - I_0}{I_3 - I_1} \delta c \tag{4}$$

If $\delta c$ is equivalent to 0.05 p.p.m. then the equation $$O_2 = \frac{I_1 - I_0}{I_3 - I_1} \times 0.05 \text{ p.p.m.} \tag{5}$$

is obtained.

This equation can be solved electrically and the answer can be presented on a continuous recording potentiometer. Provided that the three cells remain identical in respect of their zero currents and their sensitivities, then the equipment is automatically compensated against changes in cell sensitivity, changes in electrical conductivity of the water, and for changes in the temperature of the water.

A simplified electrical circuit diagram is shown in FIG. 2. The currents in the three cells produce voltages $E_1$, $E_1^1$, $E_0$, and $E_3$ across resistors $R_1$, $R_1^1$, $R_0$, and $R_3$ respectively, and the differences $(E_1 - E_0)$ and $(E_3 - E_1)$ are obtained by direct coupling of the resistors as shown in FIG. 2. The difference voltage $(E_1 - E_0)$ is amplified by the amplifier $\Delta$ and a proportion of the amplified voltage derived from the servo driven potentiometer $P_1$ is applied to the recorder REC. It is this potentiometer $P_1$ which performs the division of $(E_1 - E_0)$ by $(E_3 - E_1)$. The difference voltage $(E_3 - E_1)$ is connected in series opposition to a voltage derived from the servo driven potentiometer $P_2$, which is on the same shaft as $P_1$, and to the input of the servo amplifier SA. The action of this circuit is such that the servomotor will turn the potentiometers until the voltage from $P_2$ is equal and opposite to voltage difference $(E_3-E_1)$, when the motor will stop. The connections to potentiometer $P_1$ are so arranged that if the servomotor SM moves due to an increase in $(E_3-E_1)$ then the output of $P_1$ is decreased. Thus the output of $P_2$ is made proportional to $(E_3-E_1)$ and the output of $P_1$ inversely proportional to $(E_3-E_1)$.

The voltage presented to the recorder is $$E = (E_1 - E_0) \times \frac{R_x}{R_t}$$

where $R_t$ is the full resistance of potentiometer $P_1$ and $R_x$ is the resistance of the tapped-off portion, but $R_x \sim 1/(E_3-E_1)$ $$E = [(E_1-E_0)/(E_3-E_1)] \times \frac{k}{R_t}$$
$$= [(E_1-E_0)/(E_3-E_1)] k^1$$

where $k$ and $k^1$ are constants.

The magnitude of the rotation of the potentiometer $P_2$ for a given voltage change of $(E_3-E_1)$ is determined by the current flowing through $P_2$ and is adjusted initially by means of the potentiometer S.

The apparatus may be calibrated at any time by first of all making $E_1=E_0=E_3$, with zero water flow in all cells and no oxygen addition to cell 3, by making the recorder read zero by adjustment of $R_1$ or $R_3$. Then with water flowing through the cells and 0.05 p.p.m. oxygen added to cell 3, an additional 0.05 p.p.m. oxygen is added to all cells by means of an additional electrolysis cell $EC_1$ (only used for calibration) and the recorder is made to read 0.05 p.p.m. oxygen by adjustment of the amplifier gain. After this has been done, any further changes in zero current or cell sensitivity will be automatically compensated. Presumably the calibration would need to be checked at intervals, the frequency of which is at present being checked by tests. At present experimental apparatus has been running continuously on recirculated deaerated water for over 1000 hours with, in general, daily calibration tests, and the amount of adjustment required has been very small. CV1, CV2, and CV3 are isolated constant voltage supplies to the three measuring cells and in practice were 1.6 volts each, whilst CV4 is a supply from the rectified means.

We claim:

1. A method of measuring the concentration of a dissolved gas in a liquid comprising passing the liquid through three electrolytic cells arranged in parallel with a predetermined flow rate through two of the cells to produce thorough stirring of the liquid in said two cells and with a predetermined reduced flow rate substantially one-tenth of said first predetermined flow rate through the other cell, adding a known quantity of dissolved gas to the liquid passing through one of the relatively high flow rate cells, each cell having a substantially identical pair of electrodes with respect to the other of said cells, the electrodes of each pair being insulated from each other, applying an EMF to each cell, measuring the electric current through each cell, and utilizing the measurements to determine the concentration of the dissolved gas.

2. A method according to claim 1 wherein voltages produced by the electric currents in the cells are coupled electrically in accordance with a known mathematical equation relating said voltages to the concentration of dissolved gas and applied to control the movement of servo-driven potentiometer means so that the output thereof is proportional to the concentration of dissolved gas.

3. Apparatus for measuring the concentration of a dissolved gas in a liquid comprising three electrolytic cells arranged in parallel through which the liquid is caused to pass, the size of the flow path through the cells being such that the liquid passes with a first predetermined flow rate through two of the cells to produce thorough stirring of the liquid and through the other cell with a second predetermined and reduced flow rate substantially one-tenth of said first predetermined flow rate, each cell containing a substantially identical pair of electrodes with respect to the other of said cells, the electrodes of each pair being insulated from each other, means operatively coupled to said electrodes, for applying an EMF thereto and for producing electric currents therein, electrical resistor means arranged electrically in series with said cells having voltages produced thereacross proportional to said electric currents, circuit means for coupling electrically said voltages in accordance with a known mathematical equation relating said voltages to the concentration of dissolved gas, servo-driven potentiometer means in circuit to receive said voltages to control the movement of said potentiometer means wherein the output thereof is proportional to the concentration of dissolved gas together with means for adding a known quantity of dissolved gas both to the liquid passing through one of the high flow rate cells and to the liquid passing through all of the cells.

References Cited

UNITED STATES PATENTS

| | | | |
|---|---|---|---|
| 2,882,212 | 4/1959 | Beard | 204—195 |
| 2,886,771 | 5/1959 | Vincent | 324—30 |
| 3,151,052 | 9/1964 | Arthur et al. | 204—195 |
| 3,296,113 | 1/1967 | Hansen | 204—195 |
| 3,313,720 | 4/1967 | Robinson | 204—195 |

FOREIGN PATENTS 894,370    4/1962    Great Britain.

TA-HSUNG TUNG, Primary Examiner

U.S. Cl. X.R.

204—195, 269